Aug. 19, 1930.  G. L. FULLER ET AL  1,773,137
SUCKER ROD WIPER AND OIL SAVING DEVICE
Filed Sept. 16, 1926
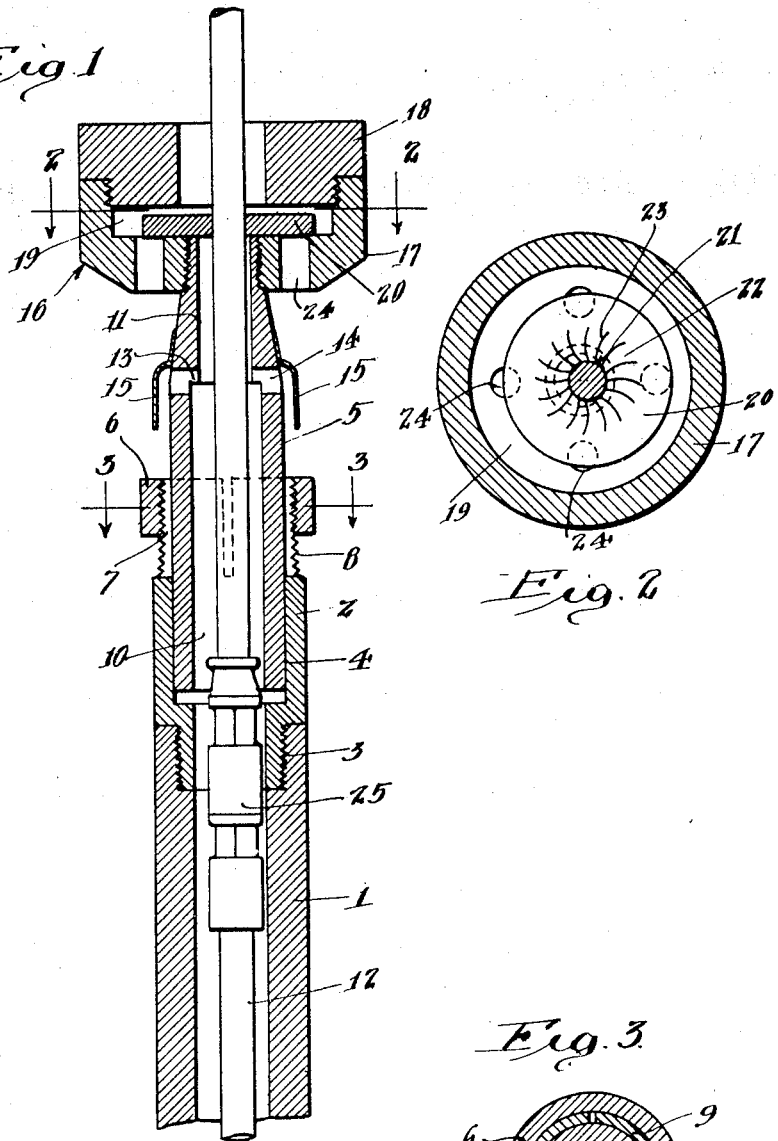
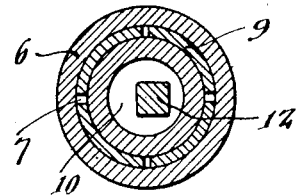
Inventors
George L. Fuller
William F. Breen
By Lyon & Lyon
Attorneys Patented Aug. 19, 1930

1,773,137

UNITED STATES PATENT OFFICE

GEORGE L. FULLER AND WILLIAM F. BREEN, OF SANTA MARIA, CALIFORNIA

SUCKER-ROD WIPER AND OIL-SAVING DEVICE

Application filed September 16, 1926. Serial No. 135,801.

This invention relates to a wiping device and oil saver. Devices of this kind are applied to the sucker rods of deep oil wells and operate, when the sucker rods are being withdrawn, to wipe off the oil and prevent its being wasted. This is desirable not only to save the oil but also to enable the rod sections to be cleaner and devoid of oil so as to facilitate their being unscrewed.

The general object of this invention is to provide a wiping device of simple construction which will operate effectively to wipe the oil from the sucker rod as it passes out of the mouth of the flow pipe and which is so constructed as to adapt itself to changes in cross section of the sucker rod, portions of which are sometimes angular in form; also to provide a device of this kind which is attached to the flow pipe in such a way as to enable it to disconnect itself automatically when struck by the plunger of the sucker rod.

Further objects of the invention will appear hereinafter.

The invention consists in the novel parts and combination of parts to be described hereinafter, all of which contribute to produce an efficient oil-saving device.

A preferred embodiment of the invention is described in the following specification, while the broad scope of the invention is pointed out in the appended claims.

In the drawing:

Figure 1 is a vertical section through the upper end of a flow pipe provided with our improvement, the flow pipe and plunger being broken away.

Figure 2 is a cross section through the wiper box or casing, taken on the line 2—2 of Fig. 1.

Figure 3 is a cross section taken on the line 3—3 of Fig. 1, but showing an angular form of rod instead of the usual round rod.

As usually constructed, a wiper for a sucker rod is made of some soft resilient material, such as rubber, and provided with a central opening through which the sucker rod passes. It has been customary to secure this wiper in a fixed position. However, this is objectionable because in pulling the rod, the rod tends to wabble or move laterally as it is being pulled. This produces a great amount of wear on the opening through the wiper and reduces the period of usefulness. According to our invention, we provide means for holding the wiper in contact with the rod, but we construct this means in such a way as to permit free lateral movement of the wiper as the rod wabbles laterally. We also support the wiper box or casing in such a way that when the plunger of the sucker rod arrives at the mouth of the well, the wiper box or casing will detach itself automatically from the flow pipe.

In order to accomplish this we prefer to provide the upper end of the flow pipe 1 with a cap 2 which may have a screw connection 3 with the flow pipe. The interior of this cap 2 forms a socket 4 to receive the lower end of a sucker rod guide 5. This cap constitutes part of the means for securing the guide 5 to the flow pipe. This means also includes a clamping nut 6 which is mounted on threads 7 on the upper end of the cap. The wall of the cap at its upper end is tapered and provided with a plurality of slits 8 which form a plurality of tongues 9 at the upper end of the cap. When the nut 6 is screwed down these tongues will be pressed inwardly so as to exert a considerable clamping force on the guide. The lower end of the guide 5 has an enlarged bore 10 which may be, if desired, of substantially the same diameter as the bore of the flow pipe. The upper end of the guide has a bore 11 of somewhat smaller diameter and which more nearly fits the diameter or dimensions of the sucker rod 12 which is received by the guide and which passes up through it.

At the point where the smaller bore 11 meets the large bore 10, an annular shoulder 13 is formed, and at this shoulder a considerable amount of oil will splash off the rod as it is pulled. In order to catch this oil, we provide the guide at this point with a plurality of lateral openings 14 which permit the oil to pass through the wall of the guide to the outside. In order to prevent this oil from squirting over the workmen around the well, we provide each opening with a downwardly projecting tongue or apron 15 which acts as a baffle for the stream of oil and deflects it downwardly toward the ground.

On the upper end of the guide we attach a wiper casing or wiper box 16 which is preferably constructed of a lower section 17 which screws onto the upper end of the guide, and a cover section 18 which screws down onto the lower section. Between the two sections 17 and 18, a wiper chamber 19 is formed. Within this wiper chamber a wiper 20 is provided, which is preferably in the form of a disc of smaller diameter than the inner diameter of the chamber 19. The wiper has a central opening 21 through which the sucker rod 12 passes. The wiper disc is constructed so that it presents a plurality of tongues 22 which project radially inwardly so as to hold their inner ends against the face of the rod. These tongues are preferably formed by providing a plurality of slits 23 in the body of the disc, and these slits pass outwardly from the edge of the opening 21. I prefer to make these slits of slightly curved or arcuate form, although they extend in a general radial direction.

With this construction it will be evident that if the sucker rod wabbles from side to side, this wabble or lateral movement will be accommodated by the large chamber 19 and will permit the wiper to "follow" the rod in any position that it may assume. This prevents any undue friction between the rod and the inner edge of the opening 21, and in any case the friction around this edge is uniform.

As the sucker rod passes up, oil which is wiped off by the wiper passes down through a plurality of openings 24 in the bottom of the chamber 19, the said openings being formed in the lower section 17 of the wiper box.

The tongues 22 are very effective in wiping the oil off the rod, and furthermore they will adapt the shape of the opening 21 to any special shape the sucker rod may have at any portion of its length. For example, in Fig. 3 the rod is indicated as being of square cross section. If the wiper had a plain round opening, it would not readily pass the rod having a square cross section, and if it did, it would not effectively wipe it.

In pulling the sucker rod, when the plunger 25 of the rod strikes the shoulder 13, no injury can be done to the guide or the wiper box because the blow will simply cause the guide 5 to move upwardly and detach itself from the jaws or tongues 9 which are clamping it frictionally in the socket 4. This device increases the safety of the workmen as it avoids the necessity for a man standing near ascending rods as is necessary in wiping them by hand.

The large bearing surface at the top of the wiper allows the rod-elevator to set squarely and does not foul the sucker-rod.

The wiper also acts as a guard for the flow T and prevents the sucker-rod from wabbling or pulling to one side and thereby wearing the threads. The wiper also acts as a stop to prevent oil and gas blowing out of the well when pulling the rod.

It is understood that the embodiment of the invention described herein is only one of the many embodiments this invention may take, and we do not wish to be limited in the practice of the invention, nor in the claims, to the particular embodiment set forth.

What we claim is:—

1. In a device of the kind described, the combination of a guide having a bore to receive the sucker rod, means for detachably supporting the same over the end of the flow pipe, a casing having a chamber within the same, and a wiper held within the chamber in the form of a disc with an opening through which the sucker rod passes, said wiper having slits in the same extending outwardly from the opening toward the periphery of the wiper so as to form a plurality of wiper tongues engaging the face of the rod.

2. In a device of the kind described, the combination of a guide having a bore to receive the sucker rod, means for frictionally supporting the same over the end of the flow pipe, a casing having a chamber within the same, and a wiper movably held within the chamber consisting of a disc having an opening through which the sucker rod passes, said wiper having a plurality of integral tongues projecting toward the rod, operating to adapt the edge of the opening to the shape of cross section of the rod as it passes through the same.

3. In a device of the kind described, the combination of a guide having a bore to receive the sucker rod, means for yieldingly attaching a guide to the upper end of the flow pipe of the well, a casing supported on the guide having a chamber within the same, and a wiper held within the chamber having an opening through which the sucker rod passes, said chamber being of larger dimensions than the wiper to permit lateral movement of the wiper in the chamber to accommodate lateral movements of the rod in the bore.

4. In a device of the kind described, the combination of a guide having a bore to receive the sucker rod, a member attached to the upper end of the flow pipe having a socket receiving the lower end of the guide, means for yieldingly clamping the lower end of the guide in the socket, a casing attached to the upper end of the guide and having an enlarged chamber within the same, and a wiper movably held within the chamber and having an opening through which the sucker rod passes.

5. In a device of the kind described, the combination of a guide having a bore to receive the sucker rod, a cap having means for attaching the same to the upper end of the flow pipe and having a socket receiving the lower end of the guide, said socket having slits formed in its wall at its upper edge and having a threaded tapered upper end, a clamping nut received on said threaded end and operating when screwed up, to clamp the upper edge of the said cap on the lower end of the guide, and a wiping device attached to the upper end of the guide.

6. In a device of the class described the combination of a guide having a bore to receive a sucker rod and appurtenances, means for detachably supporting the same over a well pipe, a casing of smaller bore and having an enlarged chamber attached to the guide at its upper end, and a flexible wiper adapted to contact with a sucker rod held within said chamber, said chamber operating to permit lateral movement of the wiper within it to accommodate lateral movement of the rod within the casing.

7. An oil saving device comprising a guide adapted to freely receive a sucker rod and appurtenances, a cap having means for firmly attaching the same to the upper end of a flow pipe and having a socket for frictionally and detachably engaging the lower end of said guide, a casing attached to the upper end of said guide, said casing being of smaller internal diameter than said guide but capable of freely receiving a sucker rod, a chamber within said casing of sufficient size to allow transverse motion of a wiper within said chamber, and a flexible wiper having a centrally disposed opening through which the sucker rod passes.

8. An oil saving device comprising a guide adapted to freely receive a sucker rod and appurtenances, a cap having means for firmly attaching the same to the upper end of a well pipe and having a socket for frictionally and detachably engaging the lower end of said guide, a casing of smaller internal diameter than said guide attached to the upper end of said guide and communicating with an enlarged chamber, a wiper within the chamber having an opening through which the sucker rod passes, said wiper being loosely positioned within said chamber to permit longitudinal and lateral movement thereof and having a plurality of tongues projecting toward the rod operating to adapt the edge of the opening to the shape of cross section of the rod as it passes through the same.

9. In an oil saving device, a sucker rod wiper consisting of a rubber disc having a continuous outer edge, and having an opening through its center with a plurality of tongues projecting inwardly toward the opening.

10. In an oil saving device, a wiper for a sucker rod consisting of a disc of relatively soft resilient material with an opening therethrough and having a continuous edge with a plurality of slits extending from the edge of the opening outwardly partly across the body of the disc, said opening being capable of temporary distortion to accommodate changes in shape of cross section of the sucker rod.

11. In an oil saving device, a wiper for a sucker rod consisting of a disc of relatively soft resilient material with an opening therethrough and having a plurality of curved slits in the same extending in a direction inclined with respect to the radial line and extending in an outward direction from the edge of the opening.

12. In a device of the kind described, the combination of a guide for a sucker rod, means for frictionally securing the same to the upper end of the flow pipe, said guide having a relatively large bore at its lower end and a smaller bore at its upper end whereby an annular shoulder is formed at the junction point of the bores, said guide having openings adjacent said shoulder to permit oil to flow out through the guide, an enlarged wiper chamber carried by the upper end of the guide, and a wiper carried within the chamber, said chamber operating to permit lateral movement of the wiper within the chamber.

Signed at Santa Maria, California, this 1st day of September, 1926.

GEORGE L. FULLER.
WILLIAM F. BREEN.